(12) United States Patent
Welin

(10) Patent No.: US 10,544,845 B2
(45) Date of Patent: Jan. 28, 2020

(54) DISK BRAKE

(71) Applicant: Haldex Brake Products AB, Landskrona (SE)

(72) Inventor: Hans Welin, Sankt Ibb (SE)

(73) Assignee: Haldex Brake Products AB (SE)

( * ) Notice: Subject to any disclaimer, the term of this patent is extended or adjusted under 35 U.S.C. 154(b) by 28 days.

(21) Appl. No.: 16/065,595

(22) PCT Filed: Dec. 22, 2016

(86) PCT No.: PCT/EP2016/082498
§ 371 (c)(1),
(2) Date: Jun. 22, 2018

(87) PCT Pub. No.: WO2017/109141
PCT Pub. Date: Jun. 29, 2017

(65) Prior Publication Data
US 2019/0249733 A1    Aug. 15, 2019

(30) Foreign Application Priority Data
Dec. 22, 2015    (EP) .................................... 15202221

(51) Int. Cl.
| | | |
|---|---|---|
| *F16D 65/56* | (2006.01) |
| *F16D 65/18* | (2006.01) |
| *F16D 55/226* | (2006.01) |
| *B60T 1/06* | (2006.01) |
| *F16D 121/08* | (2012.01) |

(Continued)

(52) U.S. Cl.
CPC ............ *F16D 65/183* (2013.01); *B60T 1/065* (2013.01); *F16D 55/226* (2013.01); *F16D 2121/08* (2013.01); *F16D 2121/14* (2013.01); *F16D 2125/36* (2013.01); *F16D 2125/587* (2013.01); *F16D 2125/64* (2013.01); *F16D 2125/70* (2013.01)

(58) Field of Classification Search
CPC ...... F16D 65/097; F16D 65/18; F16D 65/183; F16D 65/56; F16D 65/567; F16D 55/2255; F16D 55/226; F16D 2125/582
USPC ................. 188/71.7–71.9, 72.7–72.9, 196 V
See application file for complete search history.

(56) References Cited

U.S. PATENT DOCUMENTS

| | | | | |
|---|---|---|---|---|
| 7,204,351 B2 * | 4/2007 | Sandberg | ............ | F16D 65/0043 188/196 V |
| 2016/0017946 A1 * | 1/2016 | Sandberg | ................ | F16D 65/18 188/71.8 |

(Continued)

FOREIGN PATENT DOCUMENTS

| | | |
|---|---|---|
| EP | 0566006 A1 | 10/1993 |
| EP | 1384913 A2 | 1/2004 |

(Continued)

*Primary Examiner* — Christopher P Schwartz
(74) *Attorney, Agent, or Firm* — St. Onge Steward Johnston & Reens LLC

(57) ABSTRACT

The present invention relates to a disc brake having a brake actuation mechanism, the components of which are mounted in functional cooperation in the brake caliper by means of a rod, in which a brake lever is configured so that the clamping force from the actuator is substantially directed radially to the axis of the brake disc upon brake actuation, and in which the brake lever is further configured to be mounted at different angular positions around the axis of the rod.

14 Claims, 7 Drawing Sheets

(51) Int. Cl.
 *F16D 121/14* (2012.01)
 *F16D 125/36* (2012.01)
 *F16D 125/58* (2012.01)
 *F16D 125/64* (2012.01)
 *F16D 125/70* (2012.01)

(56) References Cited

U.S. PATENT DOCUMENTS

2019/0011000 A1* 1/2019 Welin .................... F16D 55/226
2019/0257379 A1* 8/2019 Sandberg ............ F16D 65/0972

FOREIGN PATENT DOCUMENTS

WO 2011113554 A2 9/2011
WO 2015135014 A1 9/2015

* cited by examiner

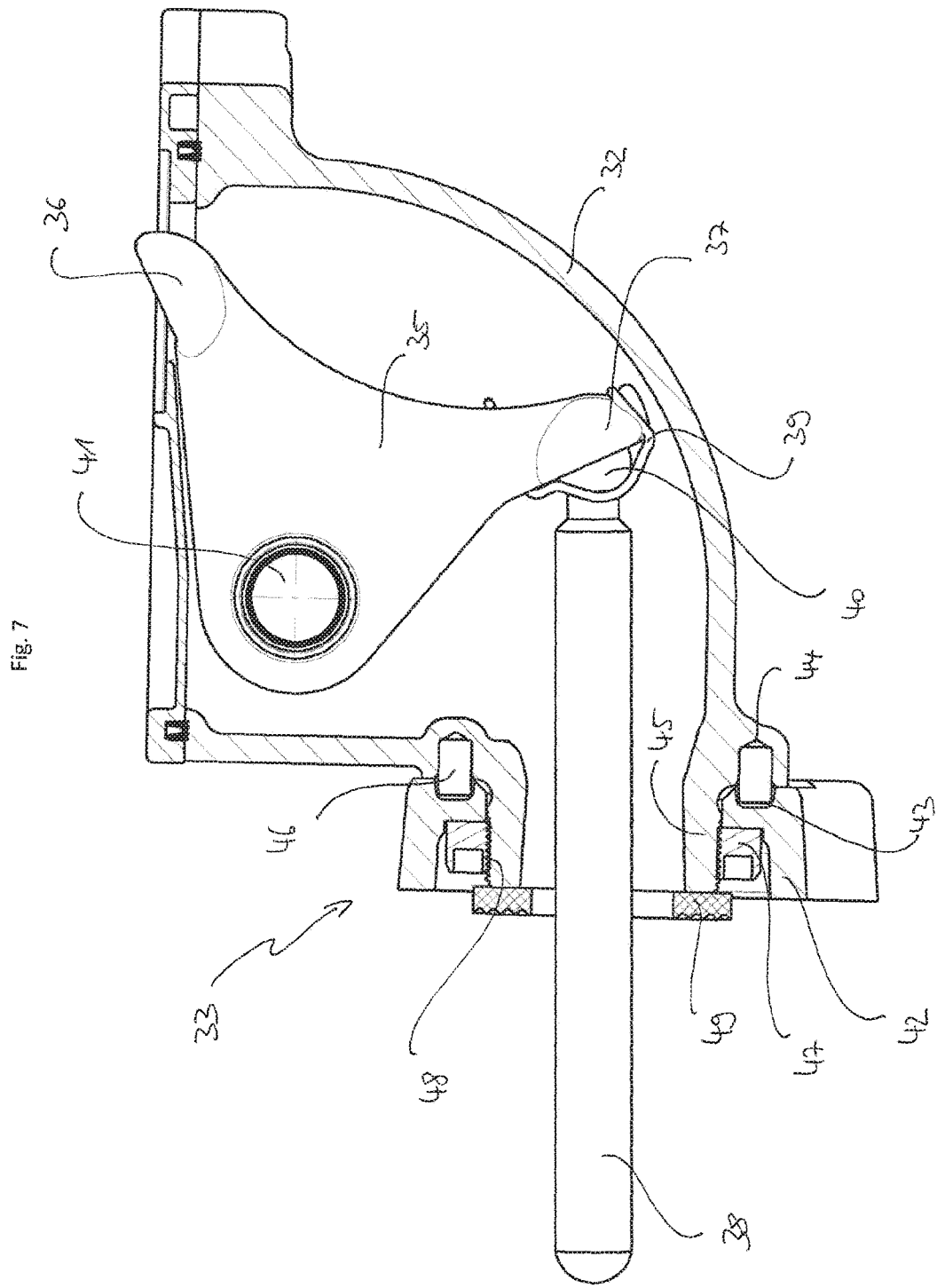

DISK BRAKE

FIELD OF THE INVENTION

The present invention relates to a disc brake, in particular for a utility vehicle.

BACKGROUND OF THE INVENTION

In this connection the invention shall include disc brakes which either comprise a sliding caliper or a fixed caliper, which overlap one or more brake discs. Mainly but not exclusively the invention relates to disc brakes of the spot-type.

Disc brakes, in particular for heavy load trucks, are known with different configurations, both with respect to the type of the actuation mechanism, with respect to the way of the transmission of the braking force onto one or several brake discs and with respect to the type of the adjustment for compensating the brake lining wear.

With respect to the brake actuation mechanism, the present invention shall preferably, but not exclusively, relate to a single tappet design as it is known e.g. from International patent application WO 2011/113554 A2 of the applicant, in which the elements of the return mechanism and the adjustment mechanism are incorporated into the tappet design and surrounded by the unit consisting of the outer and inner sleeves, which both form part of the adjustment mechanism and thus brake actuation mechanism. The adjustment mechanism incorporated therein is driven by a rotatable lever, which introduces the clamping force from an actuator into the brake actuation mechanism. The rotatable lever is arranged such that the introduction of the clamping force into the elements of the brake actuation mechanism, e.g. the thrust element and the adjuster, is directed more or less in axial direction in relation to the brake disc, i.e. in a direction substantially parallel to the rotation axis of the brake disc; the lever thus basically rotates towards the brake disc.

In contrast thereto, in a radial-type brake the rotatable lever is arranged in such a way that the clamping force is introduced into the brake actuation mechanism perpendicularly with respect to the brake disc axis, i.e. the lever basically rotates towards the brake disc axis. In this regard, the present invention shall refer to disc brakes of the radial type.

Independent from the actual design of the brake actuation mechanism to be employed in this connection, the invention aims for a new configuration and arrangement of the rotatable lever, which allows the adaptation of the disc brake, in particular with respect to the external position of an actuator, to different spatial constraints being present in different types of vehicles.

SUMMARY OF THE INVENTION

A further object can be seen in the provision of a brake actuation mechanism which is easy to assemble and the single components of which can be manufactured in an easy and cost-effective manner.

These objects, respectively, are solved by a disc brake according to the appended independent claims.

According to the invention a disc brake is proposed which comprises a brake caliper, which overlaps at least one brake disc, and a brake actuation mechanism having an amplification mechanism comprising a brake lever being rotatable around a pivot bearing for introducing a clamping force from an actuator, the brake lever having an arm extending between its actuator connection means and its transmission means, a thrust element in connection with said transmission means for transmitting the amplified clamping force onto the brake disc, in which the brake lever is configured and arranged in relation to the thrust element so that the clamping force from the actuator is substantially directed perpendicularly to the axis of the brake disc upon brake actuation, and in which the amplification mechanism and the thrust element are mounted in functional cooperation in the brake caliper by means of a rod, which rod is supported in the housing of the brake caliper so as to be not displaceable in axial direction, and in which the brake lever shall be configured to be mounted at different angular positions around the axis of the rod.

In other words, according to the invention the brake lever can be mounted in an angular position in relation to the rod, and thus in relation to the axis of the brake disc and with respect to the thrust element, to allow, in correspondence with an adapted design of the housing of the brake caliper, adaptation to different spatial constraints around the wheel axle and in the surrounding chassis, which may exist for different vehicles, as e.g. for cross-road trucks or low-floor buses.

According to one embodiment, the transmission means of the brake lever is configured to be decoupled from the thrust element so as to be rotatable with respect to the thrust element. In particular, the transmission means shall be configured such that different angular positions are allowed in relation to the thrust element.

According to an embodiment of the disc brake the brake lever may comprise a recess between its actuator connection means and its transmission means, which recess is traversed by the axis of the pivot bearing.

The recess thereby shall preferably be configured in a closed-loop design extending between the actuator connection means of the lever, usually a concavely shaped reception for receiving the distal end of a piston from the actuator, which could be of the pneumatic or hydraulic type or similar, and the transmission means, usually a half-cylindrical extension or end, with which the lever is supported against a correspondingly shaped bearing shell or similar of the adjacent thrust piece, cross bar or similar in a swiveling manner.

The closed-loop design of the recess provides a better rigidity of the lever, the latter thus, in relation to its lever arm, which rotates in relation to the thrust element, can be made with less material and thus reduced weight and still offering the same stability for taking up the torque from the actuator.

As already mentioned, the amplification mechanism and the thrust element shall be mounted in functional cooperation in the brake caliper by means of a rod, which rod is supported in the housing of the brake caliper so as to be not displaceable in axial direction, when assembled. Preferably, the rod extends with its side end facing away from the brake disc into said recess of the brake lever.

The brake actuation mechanism with all its single components shall be configured and arranged in such a way that the cooperation with the rod basically may be realized as this is described in detail in the International patent application WO 2011/113554 A2 in the name of the applicant, the disclosure of which shall herewith be exclusively included by reference.

In other words, the rod shall serve as the mounting means which keeps the single components of the brake actuation mechanism, such as the amplification mechanism, the adjuster, the thrust element, the return device and the lever, together in functional cooperation, wherein these components could be split into different self-supporting sub-modules or units for assembly purposes. In particular the rod serves to also mount the single brake components in the housing of the brake caliper in such a way that these components do act in parallel to the rotational axis of the brake disc.

In order to allow that the brake lever can be mounted in a defined angular position with respect to the rod, in particular for such single tappet designs of the brake actuation mechanism as mentioned above, the transmission means of the lever comprises a recess with is freely traversed by said rod, which allows that the transmission means can freely rotate around that rod upon assembly.

The rod can be configured such that it will be fixed in the housing of the brake caliper to be non-movably supported in axial direction.

For that purpose the disc brake according to the invention further comprises a mounting brace having means for receiving said rod in a fixed manner, said mounting brace traversing said recess of the brake lever in the assembled state of the brake actuation mechanism.

These means of the mounting brace could be configured to allow a force-fit and/or form-fit with the rod.

According to one embodiment, the free end of the rod facing away from the brake disc comprises a threaded outer surface, while the mounting brace comprises a threaded opening, so that the end of the rod could be simply screwed into that opening.

According to another embodiment, the rod and the mounting brace could comprise engagement means of different kind which are complementary in shape and dimension so as to allow a fixed connection between the rod and the mounting brace.

In order to allow disassembly of the brake actuation mechanism e.g. during overhaul works, the mounting brace is designed to be releasably fixed in the brake caliper. Accordingly, the connection between the rod and the mounting brace can be released as well, if needed.

For that purpose the brake caliper comprises a recess for receiving one end of said mounting brace and directly opposite to said recess a lateral opening for introducing the mounting brace into the brake caliper. During assembly, the mounting brace could be easily introduced through said lateral opening into the caliper, traversing the recess of the brake lever and becoming supported in the correspondingly shaped recess at a corresponding position at the inner wall of the brake caliper interior, which receives the mounting brace.

For receiving the lever extending basically with its lever arm lengthwise from the thrust element and being offset in a defined angular position with respect thereto, i.e. the lever is turned by a defined angle around the axis of the rod, the brake caliper may comprise an extended, neck-like housing section, which is configured according to the desired final angular orientation of the brake lever.

At the end of the extended section of the caliper a housing is attached which contains a force-redirecting device being supported inside the housing in a swivelling manner. The force-redirecting device is activated by an external actuator and transmits the input force from the actuator via a transmission rod to the actuator connecting means of the rotatable brake lever, which is arranged in the extended housing section.

The force-redirecting device is preferably configured as a triangular shaped lever comprising one end which receives a piston from the actuator and another end which receives the end of a transmission rod for connecting to the actuator connecting means of the brake lever, wherein both ends are orientated towards each other by a defined angle which is selected depending on the spatial needs of the entire assembly.

According to a preferred embodiment, angular connecting means are provided which are arranged between the extended section of the brake caliper and the housing of the force-redirecting device, which angular connecting means are configured to allow different angular positions of the housing of the force-redirecting device in relation to the extended section of the caliper, so as to provide further adaptation possibilities to spatial needs.

These angular connecting means may comprise a flange ring which will be fixed e.g. by bolts to a corresponding flange of the extended section of the brake caliper, in which the flange ring is configured to be fixed to the end of the housing of the force-redirecting device in relative different angular positions.

BRIEF DESCRIPTION OF THE DRAWINGS

Further advantages and features of the present invention do become apparent with respect to the embodiments shown in the attached drawings, in which

FIG. 7 is a cross-sectional view of the housing of the force-redirecting device.

DETAILED DESCRIPTION OF THE INVENTION

Figure 1:
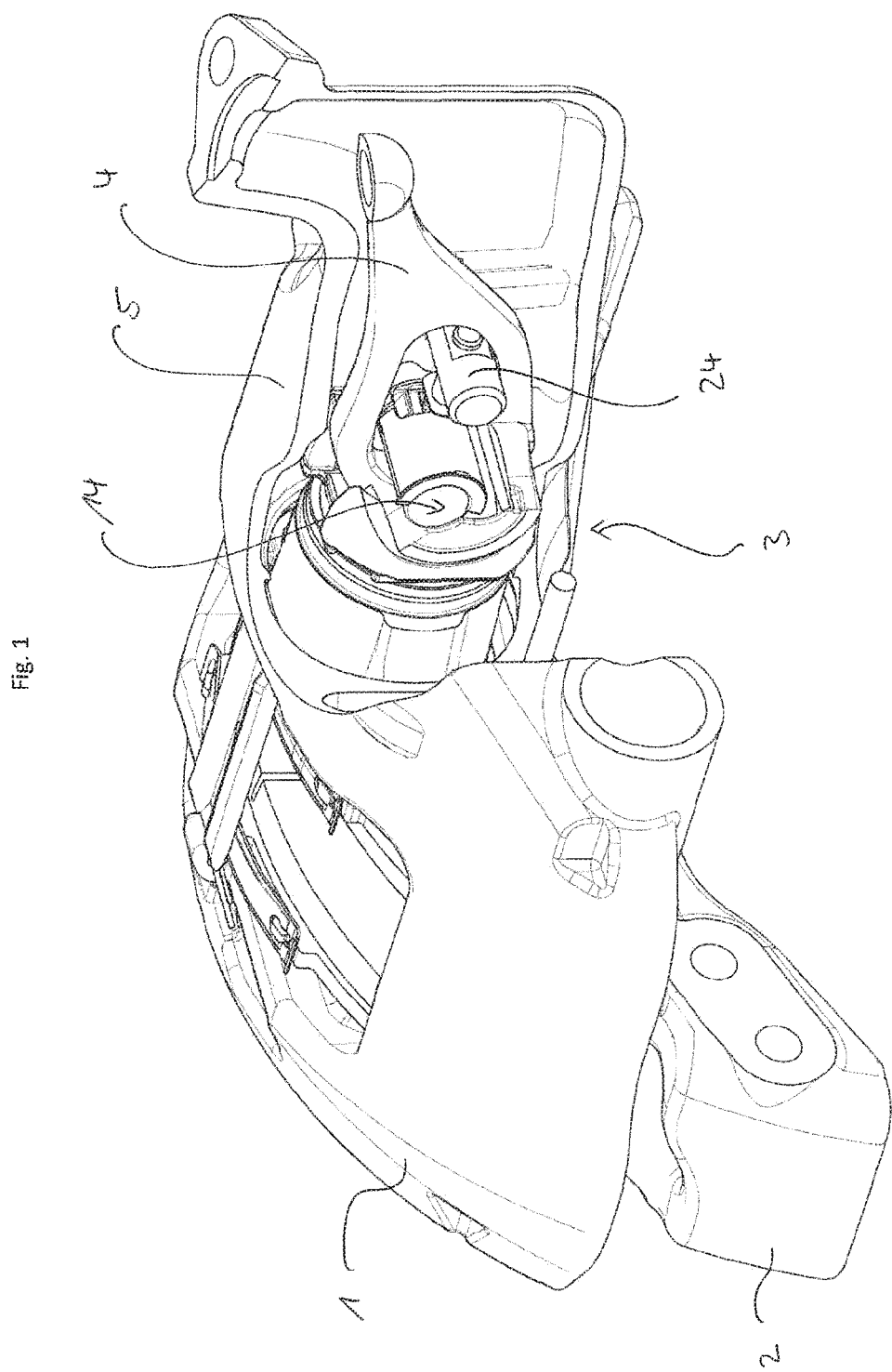
FIG. 1 is a perspective, partially cut-out view of a brake caliper containing a brake actuation mechanism with a brake lever according to the invention.

FIG. 1 shows the disc brake according to the invention in perspective view with its substantial components, which are shown in their assembled state.

The disc brake comprises a brake caliper 1 which is slideably guided on a carrier 2. The brake caliper 1 receives a brake actuation mechanism 3 preferably, but not exclusively, of that kind as it is described in WO 2011/113554 A2.

The brake actuation mechanism 3 comprises a brake lever 4, which is arranged in an extended, neck-like rear housing section 5 of the brake caliper 1 such that the clamping force exerted by a not-shown actuator onto actuator connection means 6 of the brake lever 4 will be directed substantially perpendicularly with respect to the axis of a brake disc (not shown). The lever 4 thus swivels around some degrees horizontally in relation to the brake disc axis.

The brake actuation mechanism 3 according to the invention is designed in such a way that it on the one hand enables a simple assembly in the brake caliper 1 and on the other hand realizes a faultless functioning with at the same time compact configuration due to the specific arrangement of the single components in relation to each other.

In FIG. 1 the brake lever 4 is orientated lengthwise to the axis of the brake disc.

Figure 2:
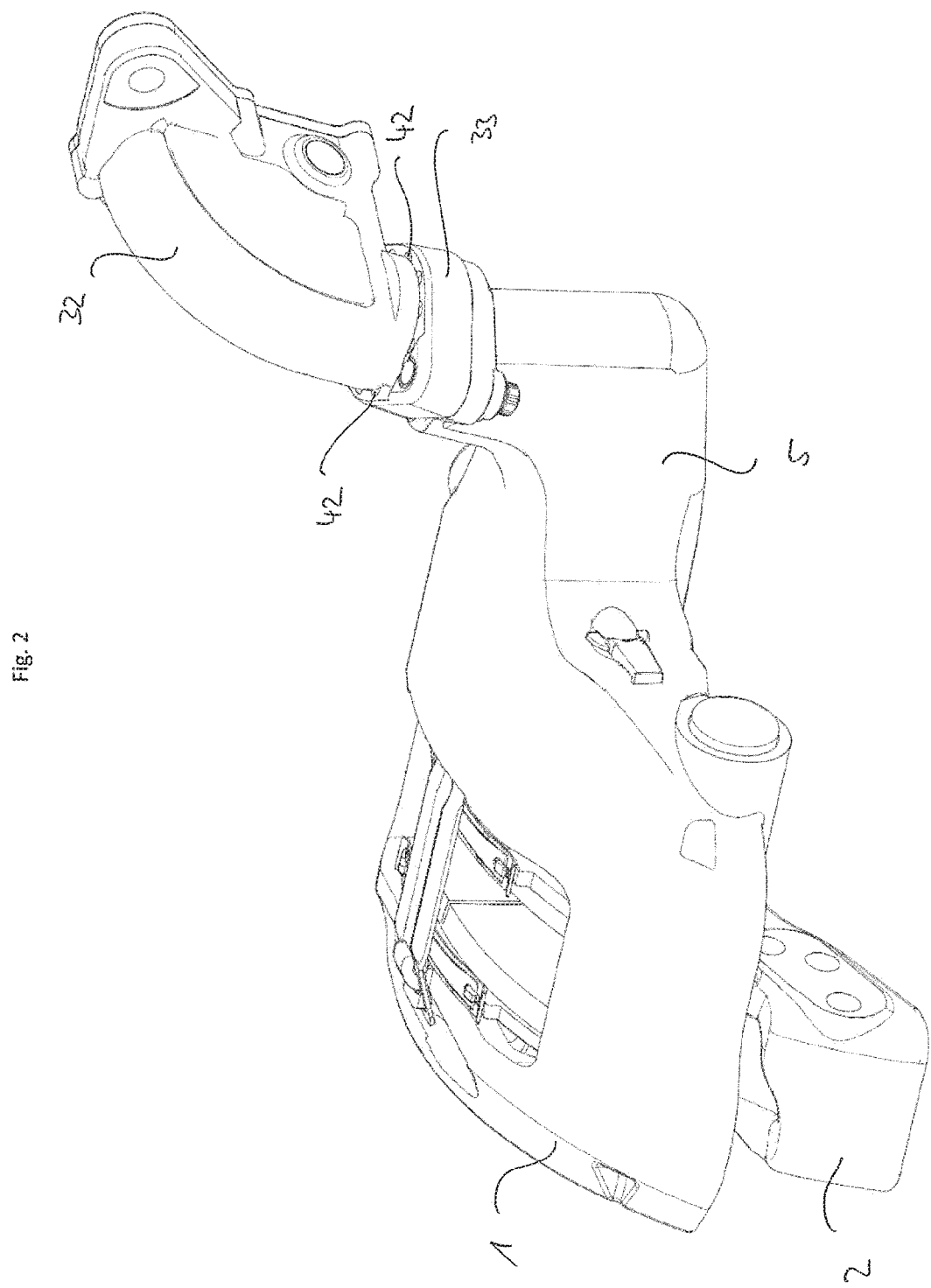
FIG. 2 is a perspective view of the brake caliper of FIG. 1 with an attached housing of a force-redirecting device.

As can be shown in FIG. 2, a housing 32 of a force-redirecting device is attached to the neck-like housing section 5 of the caliper 1 by means of angular connecting means 33. The angular connecting means in fact are configured to allow that the housing 32 of the force-redirecting device can be rotated around the neck of the housing section 5.

Figure 3:
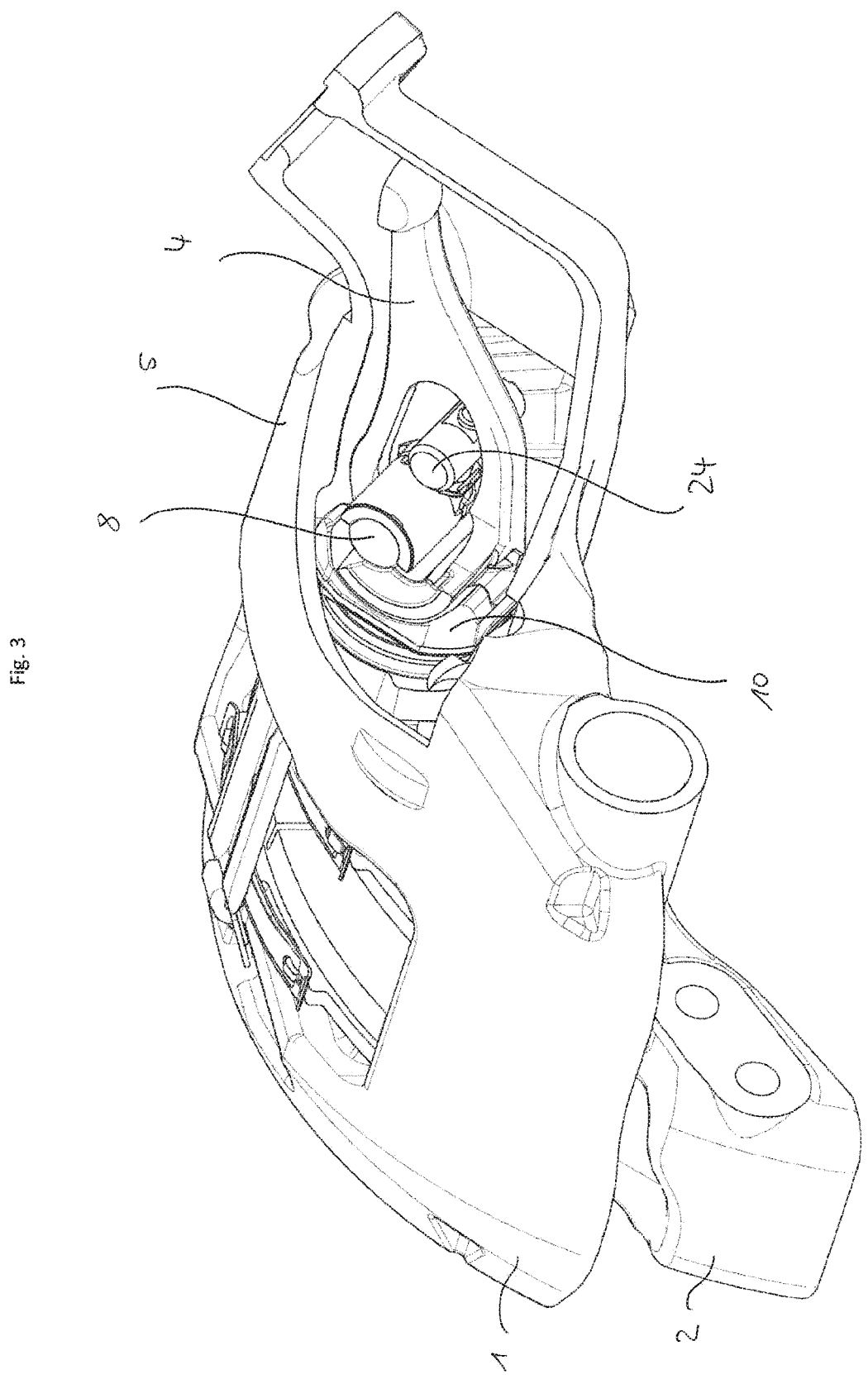
FIG. 3 is a further perspective, partially cut-out view of a brake caliper containing a brake actuation mechanism with a brake lever according to the invention showing a different angular position of the brake lever
Figure 4:
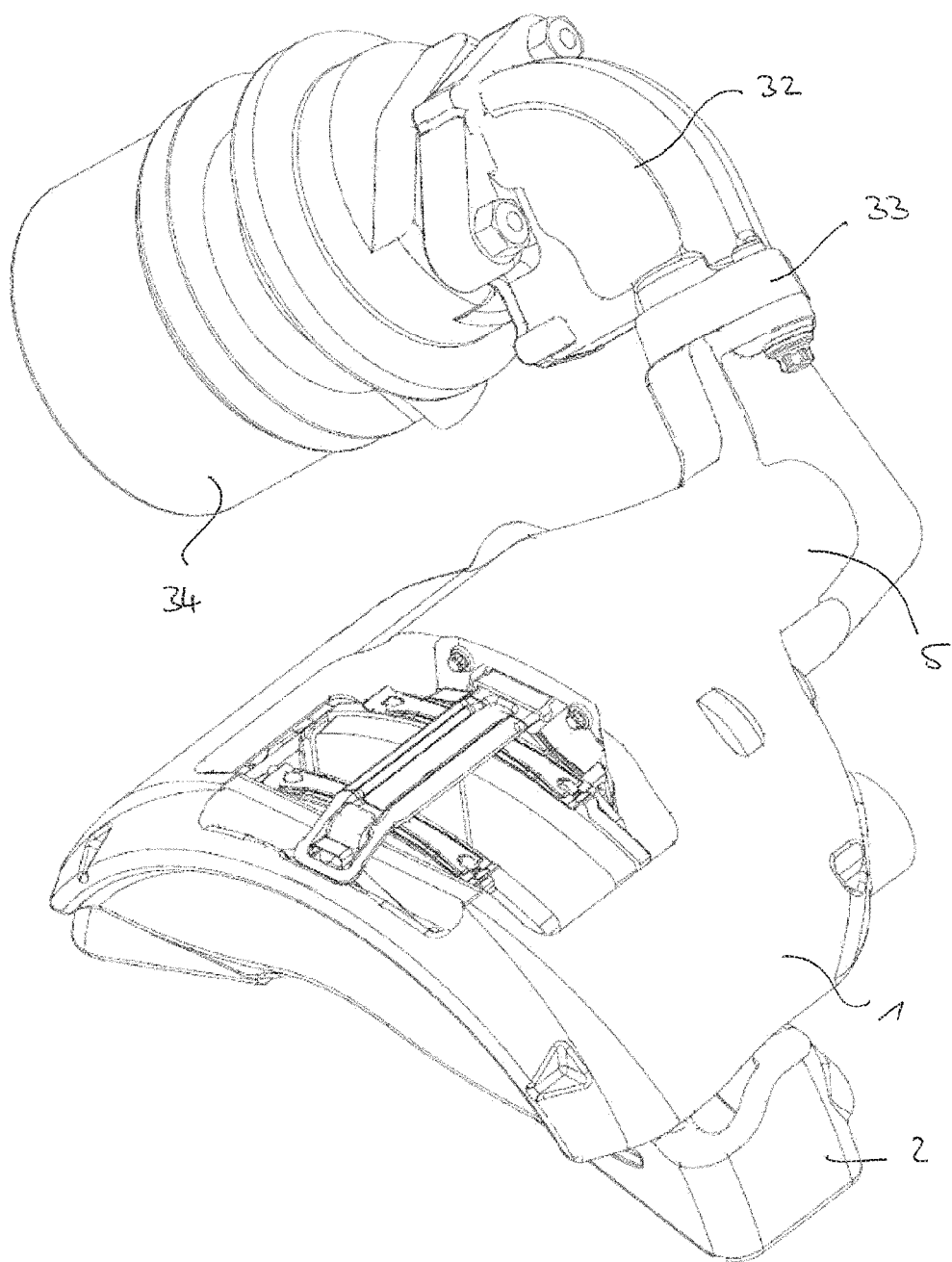
FIG. 4 is a perspective view of the brake caliper of FIG. 3 with an attached housing of a force-redirecting device and an actuator housing attached thereto.

FIG. 3 shows a perspective view in which the brake lever 4 is angularly offset, i.e. turned in relation to the axis of the brake disc. Accordingly, in FIG. 4 the position of an actuator 34, i.e. an air cylinder, is defined by the angular orientation of the brake lever 4, which is arranged in the corresponding angularly arranged extended housing section 5 of the caliper 1 and the further relative angular position of the angular connecting means 33 with respect thereto.

The principle of the angular connecting means 33 will be described in connection with FIG. 7 further down below.

Figure 5:
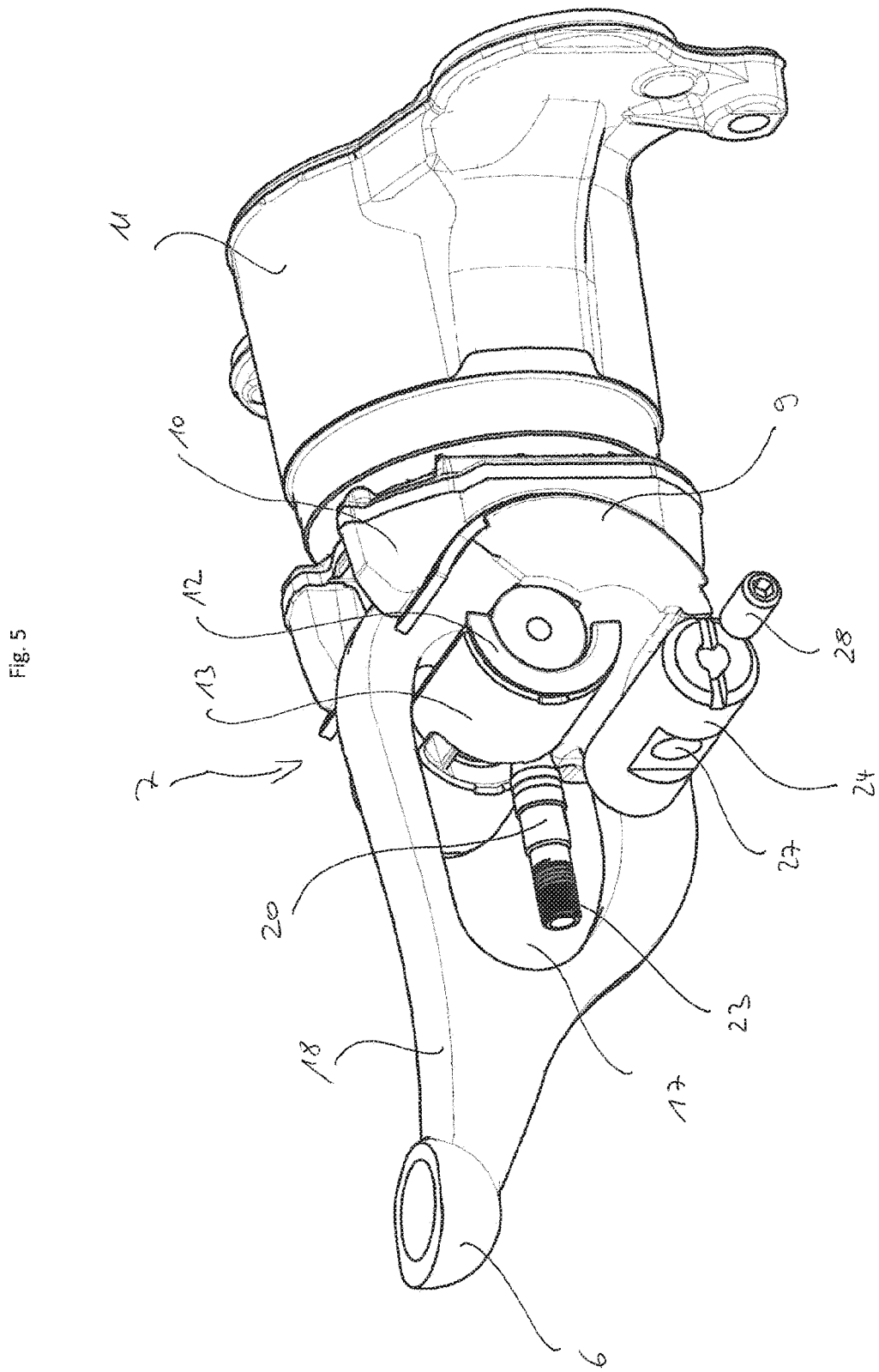
FIG. 5 is a perspective view of the brake actuation mechanism.
Figure 6:
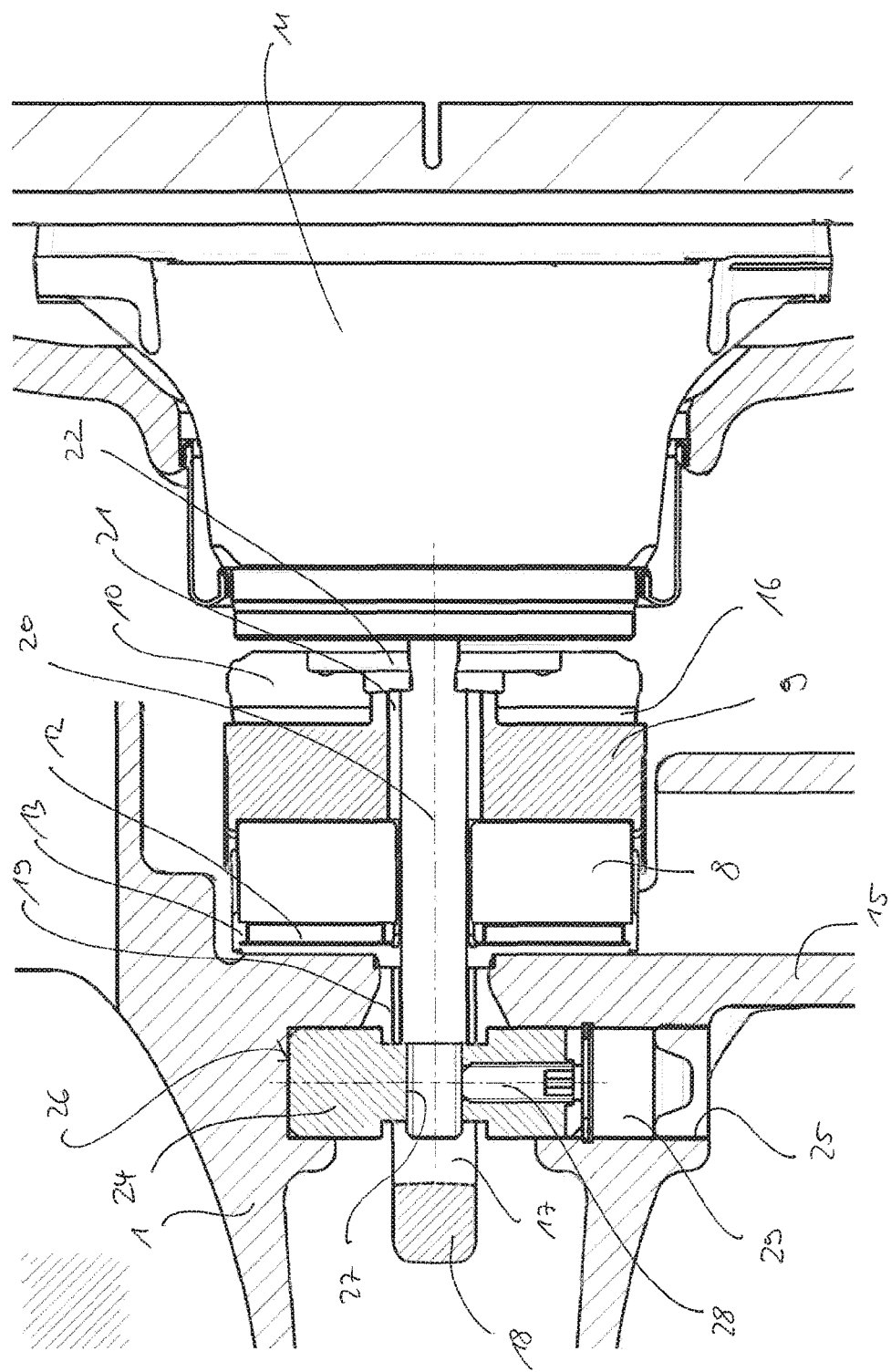
FIG. 6 is a partial horizontal cross-sectional view of the brake actuation mechanism.

In both FIG. 5 and FIG. 6 the brake actuation mechanism 3 according to the invention is shown as such.

It comprises an amplification mechanism 7, which introduces the clamping force originating from the actuator 34, e.g. via further force-redirecting means, into the brake actuation mechanism 3 and thereby enforcing it in correspondence with a gear ratio being determined by its construction. This is achieved in that the brake lever 4 is pivotably supported against two cylindrical rollers 8, which rollers 8 are eccentrically arranged with respect to transmission means 9 of the brake lever 4, with which transmission means 9 the brake lever 4 is rotatably supported against a force-transmitting block 10, the force-transmitting block 10 being in attachment with a thrust element 11.

The thrust element 11 itself is linearly axially guided in the brake caliper 1 so as to advance towards the brake disc upon rotation of the brake lever 4.

The cylindrical rollers 8 are rotatably received in corresponding needle bearing cages 12, which are arranged in two support cups 13, thereby forming an eccentric pivot bearing 14 for the brake lever 4.

The support cups 13 are supported against a traverse housing section 15 of the brake caliper 1, as can best be seen in FIG. 6.

The brake lever 4 is designed and configured in relation to the eccentric pivot bearing 14 such that upon a pivoting movement around the rollers 8 an eccentric displacement of the lever 4, namely of its transmission means 9 in relation to the rollers 8 takes place, which eccentric displacement or offset results in an enforcement of the force being introduced from the actuator into the lever 4.

Opposite to the rollers 8 the brake lever 4 is supported against the force-transmitting block 10 via further needle bearing cups 16. The force-transmitting block 10 is formed as one piece, preferably as a casted or forged component, and comprises on the side of the lever two substantially half cup-type recesses which serve for receiving the needle bearing cups 16. At the side of the brake disc the force-transmitting block 10 is formed with planar surfaces in order to abut against the thrust element 11 or any component of an adjuster mechanism (not shown) being received in the interior of the thrust element 11.

According to the invention, as can be seen in particular in FIGS. 1, 3, and 5, the brake lever 4 comprises a recess 17, which recess 17 is arranged and extends between the actuator connection means 6 and the transmission means 9. The recess 17 is basically formed as a closed loop, which allows for certain strength capabilities of the lever performance.

The arrangement of the brake lever 4 inside the housing of the caliper 1, in particular inside its extended section 5 is such that the axis of the pivot bearing 14 traverses the recess 17, as well as the traverse housing section 15 of the brake caliper 1 supporting said pivot bearing 14 traverses said recess 17.

This allows for a very compact design in particular for disc brakes of the radial type-actuation.

The brake lever 4 being made preferably as one-piece itself is split into a part of a lever arm 18, which extends with a small width to the rear of the brake caliper 1 and which basically comprises the recess 17, and into the front, brake-disc side transmission means 9, which is substantially greater in lateral width than the lever arm part 18, as can best be seen in FIG. 6.

To enable the desired compact design, the brake lever 4 of such design shall be introduced into the interior of the brake caliper 1 from the brake disc side. For that purpose, the traverse housing section 15 comprises an opening 19 through which the lever arm 18 can be inserted to swivel freely within said opening 19, while the wider transmission means 9 stay in front of the traverse housing section 15.

The brake actuation mechanism 3 comprises a centrally arranged rod 20.

As already explained above, according to the invention, in particular the rod 20 serves to keep the amplification mechanism 7 and/or a not-shown adjustment device and/or the thrust element 11 and/or a not-shown return device together as a self-supporting assembly unit, either all components as one single module or several components as separate sub-modules, each as pre-mounted self-supporting assembly units, for assembly purposes, while the central rod 2 0 is aligned coaxially to the axis of the brake disc.

As it becomes apparent from the following the rod 20 serves as mounting means for the single assembly groups of the brake actuation mechanism 3 on the one hand and as fixation means for the brake actuation mechanism 3 in the housing of the brake caliper 1 on the other.

As can be best seen in FIG. 6, for the passage of the central rod 20 the transmission means 9 of the lever 4 comprises an opening 21 and the force-transmitting block 10 comprises an opening 22, whereas the rollers 8 and the needle bearing cages 12 with the bearing cups 13 are arranged to both sides of the rod 20 at corresponding positions, respectively.

Furthermore, the rod 20 freely traverses the opening 19 in the traverse housing section 15 of the brake caliper 1 and extends with its rear end into the recess 17 of the brake lever 4, as can best be seen in FIG. 2. Basically, the rod 20 is positioned in the plane being defined by said recess 17.

At its rear end facing away from the brake disc the rod 20 comprises a thread 23.

In the assembled state of the brake actuation mechanism 3, the threaded end 23 of the rod 20 is cooperating with a mounting brace 24.

The mounting brace 24, which preferably comprises a rotationally symmetric shape, serves to fix the rod 20 and thereby the entire brake actuation mechanism 3 inside the housing of the brake caliper 1, while the mounting brace 24 traverses the recess 17 of the brake lever 4.

For that purpose, the brake caliper 1 comprises at a corresponding position a lateral opening 25, through which the mounting brace 24 can be inserted upon assembly.

Opposite to that lateral opening 25 and axially aligned thereto a rotationally symmetric recess 26 is provided at the inner wall of the brake caliper 1, as can best be seen in FIG. 6.

In the final position of the mounting brace 24, a threaded passage 27 of it is aligned with the mounting orientation of the rod 20, so that the threaded end 23 of the rod 20 can be screwed into that threaded passage 27.

In order to prevent that such threaded engagement could become loose, e.g. due to vibrations, a counter-screw 28 can be provided and axially inserted into a corresponding threaded axial opening in the mounting brace 24 so as to further block the threaded end 23 of the rod 20.

The lateral opening 25 in the brake caliper 1 can be then closed by a corresponding sealing cup 29.

According to the invention, in order to adapt to spatial needs resulting from constraints in the surroundings of the disc brake, in particular with respect to the arrangement of the external actuator, the lateral opening 25 and the inner recess 26, in aligned orientation, could be arranged angularly offset both with respect to the horizontal and vertical plane, which planes being defined in relation to the axis of the brake disc. By that the brake lever 4 can be also arranged at corresponding angular positions, as this is indicated in FIG. 3.

Thus, the brake lever 4 thereby is also angularly offset in relation to the axis or longitudinal extension of the rod 20 and to the orientation of the thrust element 11.

This is particularly enabled in that the entire brake actuation mechanism 3 according to the invention is, by the majority, rotationally symmetrically orientated around the central rod 20. Since furthermore the force-transmitting block 10 does abut against the thrust element 11 (or against components thereof) in a planar way, but rotatably decoupled therefrom, it is enabled to rotate the brake lever 4 with the single components of the amplification mechanism 7 with respect to the rod 20 and with respect to the axially linearly guided thrust element 11 and fix the brake lever 4 with the amplification mechanism 7 in the desired angular position, namely via the mounting brace 24 upon assembly of the brake actuation mechanism 3.

FIG. 7 shows a force-redirecting device being supported inside the housing 32 in a swiveling manner.

The force-redirecting device is basically configured as a triangular shaped lever 35, the one end 36 of which is adapted to attach to a piston (not shown) of an actuator, while the other end 37 of it is fixedly, but relatively movably connected to a transmission rod 38 by means of a holding clamp 39. The holding clamp 39 holds the ball-shaped end 40 of the transmission rod 38 freely rotatably in a correspondingly concave reception of the end 37 of the triangular shaped lever 35.

The transmission rod 38 shall attach to the actuator connection means 6 of the brake lever 4.

The triangular shaped lever 35 is pivotably supported in the housing 32 by means of a pivot bearing 41.

The angular connecting means 33, with which the housing 32 of the force-redirecting device 35 will be attached to the flange-like end of the housing section 5 of the caliper, comprises a flange ring 42.

The flange ring 42 comprises a circular series of recesses or bores 43, as best can be seen in FIG. 2.

A corresponding series of recesses or bores 44 is circularly arranged around a pipe section 45 of the housing 32, the pipe section 45 being traversed by the transmission rod 38.

Pins 46 can be placed at and inserted into corresponding bores 44 of the housing 32, so as to define connection means for the flange ring 42, the latter will then be fixed in a particular angular position in that bores 43 of the flange ring 42 receive the pins 46.

A nut ring 47 is provided, which will be screwed onto an outer thread 48 of the pipe section 45 and inside a circular groove of the flange ring 42, thereby fixing the latter in a previously selected relative position as defined by the pin connection between the housing 32 and the flange ring 42. Furthermore, a sealing ring 49 is provided to seal the housing 32 in relation to the brake caliper 1.

LIST OF REFERENCE NUMERALS

1 Brake caliper
2 Carrier
3 Brake actuation mechanism
4 Brake lever
5 Rear extending housing section
6 Actuator connection means
7 Amplification mechanism
8 Rollers
9 Transmission means
10 Force-transmitting block
11 Thrust element
12 Needle bearing cage
13 Support cups
14 Eccentric pivot bearing
15 Traverse housing section
16 Needle bearing cup
17 Recess of lever
18 Lever arm part
19 Opening in traverse housing section
20 Rod
21 Opening
22 Opening
23 Threaded end of rod
24 Mounting brace
25 Lateral opening in caliper
26 Lateral recess in caliper
27 Threaded passage in mounting brace
28 Counter-screw
29 Sealing plug
30
31
32 Housing force-redirecting device
33 Angular connecting means
34 Actuator
35 Triangular lever/force-redirecting device
36 End to actuator
37 End to transmission rod
38 Transmission rod
39 Holding clamp
40 Ball-shaped end
41 Pivot bearing
42 Flange ring
43 Bores of flange ring
44 Bores of pipe section
45 Pipe section
46 Pins
47 Nut ring
48 Thread
49 Sealing

The invention claimed is:

1. A disc brake comprising a brake caliper, which overlaps at least one brake disc, and a brake actuation mechanism having an amplification mechanism comprising a brake lever being rotatable around a pivot bearing for introducing a clamping force from an actuator, the brake lever having an arm extending between its actuator connection means (6) and its transmission means, a thrust element in connection with said transmission means for transmitting the amplified clamping force onto the brake disc, in which the brake lever is configured and arranged in relation to the thrust element so that the clamping force from the actuator is substantially directed perpendicularly to the axis of the brake disc upon brake actuation, and in which the amplification mechanism and the thrust element are mounted in functional cooperation in the brake caliper by means of a rod, which rod is supported in the housing of the brake caliper so as to be not displaceable in axial direction, characterized in that the brake lever is configured to be mounted at different angular positions around the axis of the rod.

2. The disc brake of claim 1, in which the transmission means of the brake lever is configured to be decoupled from the thrust element so as to be rotatable with respect to the thrust element.

3. The disc brake of claim 1, in which the transmission means of the brake lever are configured to allow different angular positions in relation to the thrust element.

4. The disc brake of claim 1, in which the brake lever comprises a recess between its actuator connection means and its transmission means, which recess is traversed by the axis of said pivot bearing.

5. The disc brake of claim 4, in which the rod extends into said recess.

6. The disc brake of claim 5, further comprising a mounting brace having means for receiving said rod, said mounting brace traversing said recess.

7. The disc brake of claim 6, in which the means of the mounting brace are configured to allow a force-fit and/or form-fit with the rod.

8. The disc brake of claim 6, in which the mounting brace is releasably fixed in the brake caliper.

9. The disc brake of claim 8, in which the brake caliper comprises a recess for receiving one end of said mounting brace and opposite to said recess an opening for introducing the mounting brace.

10. The disc brake of claim 1, in which the brake caliper comprises an extended section for receiving the brake lever.

11. The disc brake of claim 10, in which the actuator connecting means cooperates with a transmission rod, the transmission rod being activated by a force-redirecting device transmitting an input force from an actuator.

12. The disc brake of claim 11, in which the force-redirecting device is supported in a swiveling manner inside a housing, the housing being attached to the extended section.

13. The disc brake of claim 12, in which angular connecting means are arranged between the extended section and the housing, which angular connecting means are configured to allow different angular positions of the housing in relation to the extended section.

14. The disc brake of claim 13, in which the angular connecting means comprise a flange ring, which is configured to enter into releasable pin connection with the housing.

* * * * *